US008817663B2

(12) United States Patent
McEachern et al.

(10) Patent No.: US 8,817,663 B2
(45) Date of Patent: Aug. 26, 2014

(54) METHODS, SYSTEMS, AND NON-TRANSITORY COMPUTER READABLE MEDIA FOR CREATING AND MANAGING AD-HOC GROUPS LINKED TO AN EVENT AND SPANNING MULTIPLE MODES OF COMMUNICATION

(75) Inventors: James Angus McEachern, Stittsville (CA); Richard Charles Taylor, Manotick (CA); Michael Leeder, Stittsville (CA); Carroll Louise Gray-Preston, Morrisville, NC (US); John McCready, Sudbury, MA (US)

(73) Assignee: Genband US LLC, Frisco, TX (US)

( * ) Notice: Subject to any disclaimer, the term of this patent is extended or adjusted under 35 U.S.C. 154(b) by 288 days.

(21) Appl. No.: 13/348,623

(22) Filed: Jan. 11, 2012

(65) Prior Publication Data

US 2013/0176895 A1 Jul. 11, 2013

(51) Int. Cl.
*H04M 3/56* (2006.01)

(52) U.S. Cl.
USPC .............................. 370/254; 370/252; 370/261

(58) Field of Classification Search
CPC .......... H04L 47/10; H04L 43/50; H04L 41/12; H04L 45/02; H04L 29/06027; H04M 3/56
USPC ................................... 370/252, 254, 260, 261
See application file for complete search history.

(56) References Cited

U.S. PATENT DOCUMENTS

| 2004/0047461 | A1* | 3/2004 | Weisman et al. ......... 379/202.01 |
| 2006/0045030 | A1* | 3/2006 | Bieselin .................... 370/260 |

\* cited by examiner

*Primary Examiner* — Ronald Abelson
(74) *Attorney, Agent, or Firm* — Fogarty, L.L.C.

(57) ABSTRACT

A method for creating and managing ad-hoc groups linked to an event and spanning multiple modes of communication includes creating an ad-hoc group associated with an event. Available modes of communication are determined for each participant in the group. For each mode of communication, first information for contacting each participant is determined. Second information that serves as an alias for each participant is determined. A consolidated view of the available modes of communication with each of the participants in the group is provided using the aliases.

23 Claims, 12 Drawing Sheets

METHODS, SYSTEMS, AND NON-TRANSITORY COMPUTER READABLE MEDIA FOR CREATING AND MANAGING AD-HOC GROUPS LINKED TO AN EVENT AND SPANNING MULTIPLE MODES OF COMMUNICATION

TECHNICAL FIELD

The subject matter described herein relates to methods and systems for enhancing communications associated with a scheduled event. More particularly, the subject matter described herein relates to methods, systems, and non-transitory computer readable media for creating and managing ad-hoc groups linked to an event and spanning multiple modes of communication.

BACKGROUND

Calendaring applications allow users to set up events, send invitations to an event, and to be reminded when the event is about to start. Information, such as location, or bridge details for conference calls, may be associated with an event. However, conventional calendaring applications do not provide any support for other methods of communication that participants might want to establish. In particular, they do not provide a mechanism to provide a consolidated view of all communications options for event participants. Existing techniques also do not allow automatic generation of ad-hoc groups across different communications services. To compensate for this inability, participants will often set up other communication channels outside the scope of the event, according to the particular needs of each communications service, using manual techniques.

Examples include setting up a chat room for selected participants on a conference call (perhaps all participants from the same company), potentially across multiple systems; manually exchanging phone numbers before going to an industry conference; exchanging contact information before going to a music festival, and the like.

In addition to being time-consuming to set up, the associations established for the event continue to exist after the event ends, unless the participant manually deletes the association. In some cases, it is difficult or even impossible to delete an association once established; after information is made public, it generally cannot be made private again. For example, once a phone number has been given out, it cannot be taken back.

One conventional solution to this problem is to enhance the contact information or reminders associated with calendar programs. This solution, however, does not provide integrated linkages to other communications mechanisms, and does not provide a consolidated view across multiple communication services. It also does not provide a mechanism to reliably delete associations after the event has finished.

Another conventional solution to this problem is to create "portal" applications that combine multiple applications. For example, there are IM programs that will import users from other IM programs. However, these tend to have very limited scope (e.g. only selected IM programs) and very limited consolidation (e.g. combined list that cannot reflect the look and feel of the original programs). These programs also do not integrate well with the calendar applications, and must be launched separately. They also do not provide a mechanism to reliably delete associations after the event has finished.

Yet another conventional solution to this problem is a web conferencing program that includes the capability to initiate sidebar communications with other participants, or to communicate with all other participants. However, such programs do not support flexible ad-hoc groups within the participant list, and they do not support communications across multiple platforms or communications services with a single action.

Accordingly, in light of these disadvantages associated with conventional approaches to coordinating communication between multiple participants of a scheduled event, there exists a need for methods, systems, and non-transitory computer readable media for creating and managing ad-hoc groups linked to an event and spanning multiple modes of communication.

SUMMARY

According to one aspect, the subject matter described herein includes a method for creating and managing ad-hoc groups linked to an event and spanning multiple modes of communication. The method includes: creating an ad-hoc group associated with an event, the group comprising a plurality of participants; determining, for each participant in the group, available modes of communication with the participant; determining, for each mode of communication, first information usable in a network associated with each mode of communication for contacting the participant in the corresponding mode of communication; and creating, for each mode of communication, second information that serves as an alias for the participant. A consolidated view of the available modes of communication with each of the participants in the group is provided, the view not including the first information. The view may or may not include the second information. The method further includes receiving communications directed to a first participant in the group, the first participant being identified using the first participant's second information, and redirecting the communications to the first participant using the participant's first information.

According to another aspect, the subject matter described herein includes a system for creating and managing ad-hoc groups linked to an event and spanning multiple modes of communication. The system includes a communication interface for sending and receiving network messages and a control module, coupled to the communication interface, for creating and maintaining an ad-hoc group associated with an event, the group having multiple participants. For each participant in the group, available modes of communication with the participant are determined, and for each mode of communication, first information usable in a network associated with each mode of communication for contacting the participant in the corresponding mode of communication is determined. For each mode of communication, second information that serves as an alias for the participant is created. The control module provides a consolidated view of the available modes of communication with each of the participants in the group, the view not including the first information. In one embodiment, the view includes the second information. The control module receives communications directed to a first participant in the group, the first participant being identified using the first participant's second information, and redirects the communications to the first participant using the participant's first information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and non-transitory computer readable media for creating and managing ad-hoc groups linked to an event and spanning multiple modes of communication are provided. Reference will now be made in detail to exemplary embodiments of the present invention, examples of which are illustrated in the accompanying drawings. Wherever possible, the same reference numbers will be used throughout the drawings to refer to the same or like parts.

Figure 1:
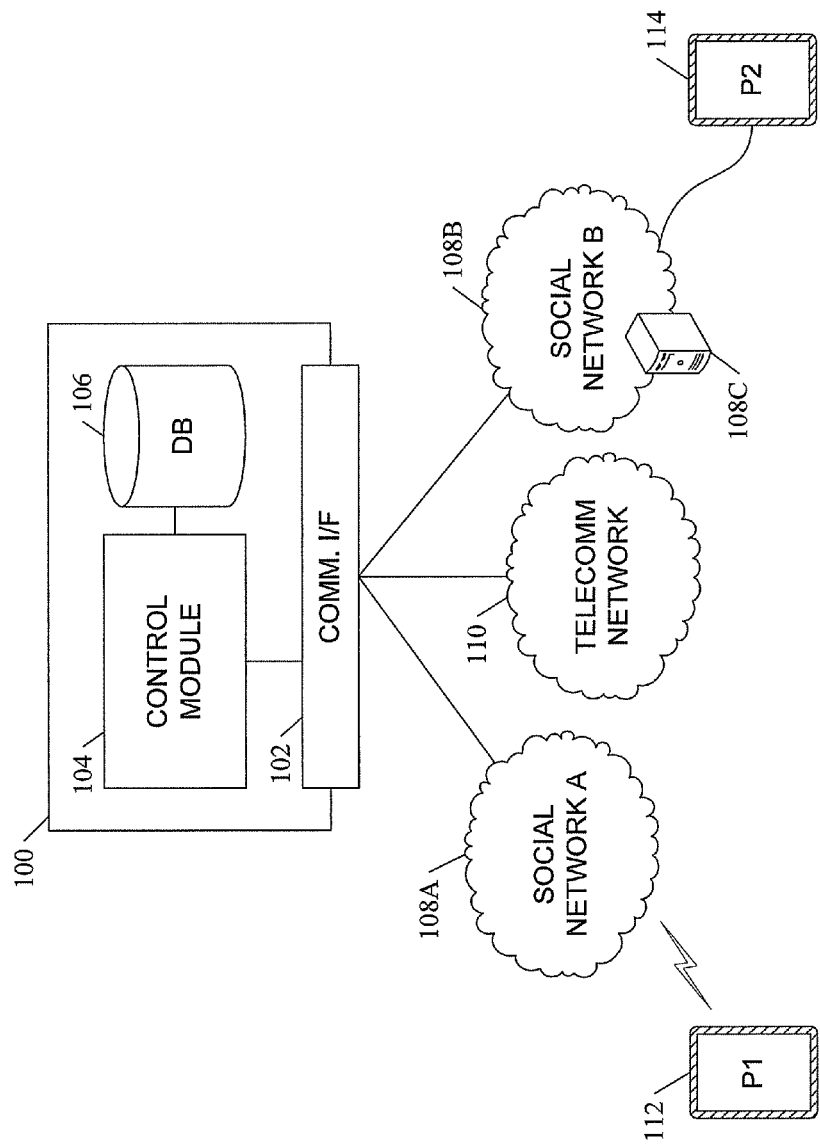
FIG. 1 is a network diagram illustrating an exemplary system for creating and managing ad-hoc groups linked to an event and spanning multiple modes of communication according to an embodiment of the subject matter described herein.

FIG. 1 is a network diagram illustrating an exemplary system for creating and managing ad-hoc groups linked to an event and spanning multiple modes of communication according to an embodiment of the subject matter described herein. In the embodiment illustrated in FIG. 1, system 100 includes a communication interface 102 for sending and receiving network messages using various modes of communication. Communication interface 102 may include, for example, a wired or wireless Ethernet interface, a bus interface, a cellular telephone or other radio frequency interface, an optical interface, a public switched telephone network (PSTN) interface, such as a signaling system number seven (SS7) interface, or other communication interface that sends and receives network messages.

Coupled to communication interface 102 is a control module 104 for creating and maintaining one or more ad-hoc groups associated with one or more events, where each group includes multiple participants. In one embodiment, control module 104 may be, be a component of, or include a hardware processor, such as a microcontroller or microprocessor, an application specific integrated circuit (ASIC), etc. Control module 104 may provide a mechanism by which ad-hoc groups may be created, maintained, modified, deleted, or otherwise administered. For example, control module 104 may provide a web page through which groups and group participants may be administered. In one embodiment, groups and participants may be freely created, maintained, and destroyed by anyone. In another embodiment, these functions may be performed only by qualified participants or administrators.

Membership in an ad-hoc group may be by invitation only, may be available to anyone, or anything in between. In one embodiment, one or more group leaders or administrators may be responsible for deciding who may and may not be a participant in the group. Alternatively, participation in the group may be allowed with few or no restrictions or restraints. Moreover, the decision whether group membership is open to all or open only to qualifying participants may be decided on a group-by-group basis.

Regardless of how participants join or otherwise become associated with a group, control module 104 determines, for each participant in the group, available modes of communication with the participant. For example, control module 104 may prompt a participant to indicate his or her available modes of communication, or provide a web page or other configuration pane into which the participant enters this data. Alternatively, a client application on the participant's device may be able to access the participant's profile information and read or deduce modes of communication associated with the participant, e.g., by reading the user's vcard or other form of contact information, or reading the user's configuration information. In one embodiment, a participant may be required to register with system 100 as a prerequisite to joining any group, in which case system 100 may require that the participant supply the necessary information as part of the registration process.

Figure 7:
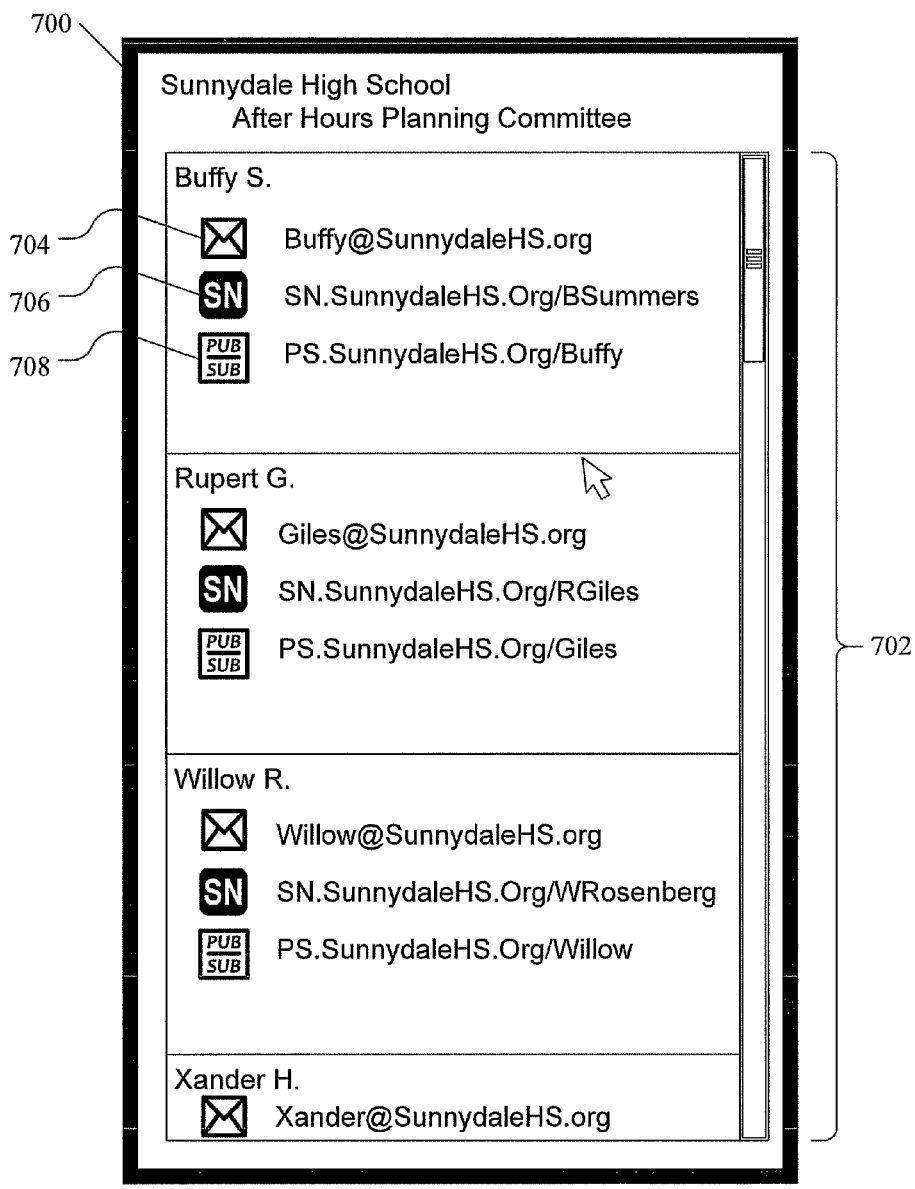
FIG. 7 is a computer screen shot illustrating an exemplary consolidated view of the available modes of communication with each of the other participants in the group according to another embodiment of the subject matter described herein.

For each of the available modes of communication, control module 104 determines first information usable in a network associated with each mode of communication for contacting the participant in the corresponding mode of communication and creates second information that serves as an alias for the participant. The mechanism for establishing an alias will depend on the specific mode of communication, and may be limited by user or application policies. Control module 104 then provides to each participant in the group a consolidated view of the available modes of communication with each of the other participants in the group. The first information is not made available to the participants of the group, but is used by control module 104 as needed to establish communications between two or more participants. The second information may or may not be displayed in the consolidated view or otherwise made available to the other participants of the group. An example of a consolidated view that does not display the second information is shown in FIG. 4B and an example of a consolidated view that does display the second information is shown in FIG. 7, both of which will be described in more detail below.

In one embodiment, the subject matter described herein may be implemented within a smart device, such as a smart phone or tablet, within PC software applications, or as web-based applications. It can also be implemented as a network-based service, or as a combination of client and network based components. For example, the subject matter described herein may be implemented as part of a blended communications application running on a device (e.g. smartphone, tablet, PC client, web browser client, etc.), within a network server or proxy function, or some combination that includes client and network components. In one embodiment, the blended communications application may be positioned in such a way that it is able to observe some or all of a user's social communications. For example, a blended communications application may execute on a user's mobile device, or could alternatively be a proxy server through which all of a user's communication traffic travels.

One point to note about the locating or hosting all of the functionality of system 100 on a user's device instead of a network server or in a client/server configuration is that the owner of the device may have access to each participant's first information, which is the information that is intended to be hidden from the other participants. Locating the portion of the system which maps the publically available second information to the private first information on a network server with appropriate authentication, authorization, and access controls would theoretically prevent anyone but a legitimate administrator with sufficient rights and permissions from getting access to the private information. On the other hand, there may be a natural division of labor between the network server and multiple clients. For example, in one embodiment, a blended application running on the participant's smart device may perform some level of authentication and authorization before allowing access to the consolidated view and its associated functions.

Likewise, the blended application could go through the process of determining the user's available modes of communication, as well as determine the first information usable in a network associated with the mode of communication for contacting the participant in the corresponding mode of communication. For example, in one embodiment, an application running on the user's smart phone may read user profile information, e.g., from the device itself or from a website known to be associated with the user, detect that the user has a Facebook address and an email account, and prompt the user to provide login, password, or anything else required to use those two modes of communication. Alternatively, the blended application running on the user's device may have a configuration pane where this information may be entered by the user.

In one embodiment, the ad-hoc group or the messages exchanged between participants in the group may span multiple social networks. For example, one participant may have a presence on Facebook™ and another participant may have a presence on Google+™, in which case system 100 will allow messages to be communicated between the two participants using mechanisms, protocols, or identities specific to each respective social network.

Figure 2:
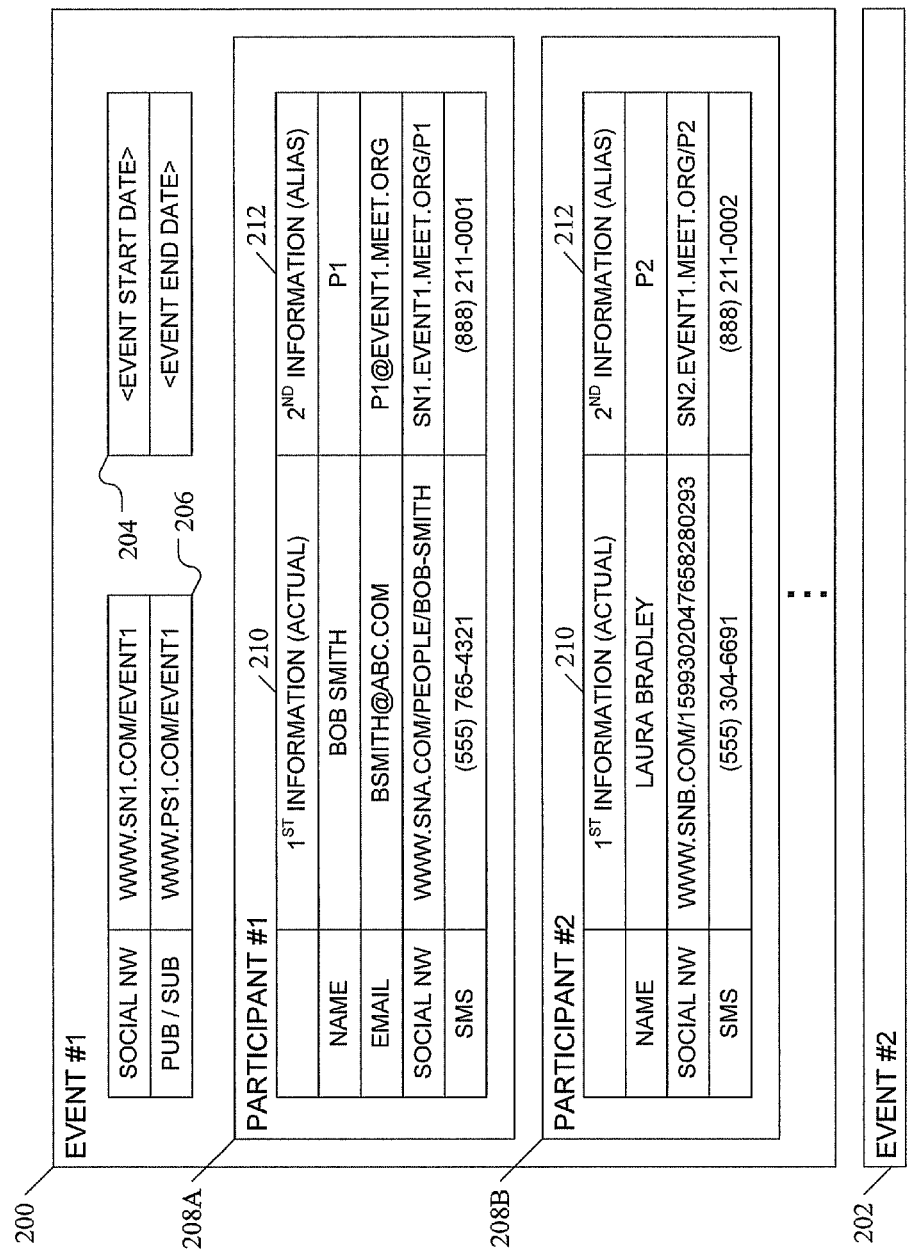
FIG. 2 is a diagram illustrating exemplary information that may be stored and maintained by a system for creating and managing ad-hoc groups linked to an event and spanning multiple modes of communication according to an embodiment of the subject matter described herein.

In one embodiment, both the first and second information for every participant is stored and maintained by system 100. In the embodiment illustrated in FIG. 1, for example, control module 104 may maintain this information using a database 106 or other data storage means. An example of the kinds of information that may be maintained by control module 104 is shown in FIG. 2, which will be described in more detail below.

In FIG. 1, communication interface 102 may send and receive messages using multiple modes of communication. For example, communication interface may send and receive SMS text messages, email messages, publish/subscribe ("pub/sub") messages, such as Twitter™ messages, and so on. In one embodiment, communication interface 102 may send and receive messages from multiple different social networks. In the embodiment illustrated in FIG. 1, system 100 communicates with two separate social networks, social network A 108A and social network B 108B, which are collectively referred to herein as "social networks 108." Each social network may include one or more servers to handle messages and other traffic associated with the social network as well as other tasks performed by the social network. For example, in the embodiment illustrated in FIG. 1, social network B 108B includes a server 108C. Server 108C may host one or more services, including but not limited to email, instant messaging, chat services, text messaging, telephone or web conferencing, publish/subscribe services, web hosting, and other services.

In one embodiment, system 100 may communicate with one or more telecommunications networks, such as telecommunication network 110. Example telecommunication networks include the internet, IP networks, IMS networks, local or private networks, intranets, private branch exchanges (PBX), and the like. System 100 may communicate with or be integrated with enterprise-level networks, such as enterprise-hosted email or calendar applications, for example, and may carry or generate over the top (OTT) content.

A first participant (P1) 112 and a second participant (P2) 114 are two members of an ad-hoc group created and maintained by control module 104. An example showing messages that may be exchanged between participants of an ad-hoc group is shown in FIG. 4, which will be described below.

FIG. 2 illustrates the kinds of first and second information that may be stored and maintained by control module 104 according to an embodiment of the subject matter described herein. In one embodiment, this information may be stored or maintained in database 106. In the embodiment illustrated in FIG. 2, each of the ad-hoc groups that are created correspond to a particular event, although ad-hoc groups may be created that do not correspond to a particular event. FIG. 2 shows data for two events, event1 200 and event2 202.

Event-specific data may be associated with each event. In the embodiment illustrated in FIG. 2, for example, event1 200 has event-specific data 204, which includes a start date and an end date. The start and end dates may be used to define the window of time during which participants may communicate with each other using system 100. In one scenario, the event end date corresponds to the end of an actual event, such as a business conference, after which system 100 will no longer provide the consolidated view of event participants' modes of communication. Alternatively, system 100 could continue to provide the consolidated view but deactivate or disable communications between participants via that view. Additional information may be associated with an event. In the embodiment illustrated in FIG. 2, for example, an event organizer or other entity may set up a page in a social network as a repository for event information or to provide a forum for member use. Likewise, an account on a pub/sub service may be established and associated with the event. In the embodiment illustrated in FIG. 2, this information may be stored as data 206. Other event-specific data may also be maintained, such as event location(s), limitations or restrictions on participants, related events, etc.

Information for each participant may also be maintained. In the embodiment illustrated in FIG. 2, for example, participant information is stored in participant records 208A and 208B. Participant information may include first information 210 and second information 212. In one embodiment, first information 210 is the participant's actual contact information, such as the participant's real name and email address, the URL of the participant's page on Facebook™, Google+™, or other social network site, the telephone number to which SMS messages may be sent, and so on. This information is stored within system 100 and used by system 100 but is not displayed or made available to other participants in the same ad-hoc group. Instead, second information 212 is generated by system 100 and provided or displayed to other participants in the ad-hoc group.

In the example illustrated in FIG. 2, participant record 208A contains information associated with a first participant in event #1 200. The first participant is named Bob Smith, but in the consolidated view, he may be displayed as "Participant 1", or "P1" for short. In one embodiment, the participant may choose whether to use this deliberately anonymous screen name or use a more personalized name, such as "Bob.S", his actual name, such as "Bob Smith", or a favorite nickname. His actual email address is "bsmith@abc.com", but system 100 may generate an alias email, such as "p1@event1meet.org", where "Meet.Org" could be a domain name reserved for use by the system provider, for example. Bob Smith may have a page on social network A (SNA), with a URL such as "www.SNA.com/People/Bob-Smith, but system 100 provides an alias URL, such as "SN1.event1.meet.org/P1". By providing aliases that are directed to a domain owned by the owner of system 100, communication between participants will be directed, at least initially, to system 100 so that control module 104 can receive communication intended for a participant who was identified by the participant's alias (2nd information), retrieve the participant's actual address (1st information), and redirect the communication appropriately.

In one embodiment, system 100 may reserve VoIP telephone numbers, which it provides as an alias so that participants in the ad-hoc group may exchange text or SMS messages. In one embodiment, system 100 may include PSTN or VoIP telephony capability that would allow participants to communicate with each other via a voice telephone call. In the embodiment illustrated in FIG. 2, participant 1 208A can accept SMS messages on his cell phone, which has the telephone number (555) 765-4321. System 100 provides an alias SMS contact number, such as (888) 211-0001, out of its block of reserved numbers (888) 211-0000 through (888) 211-9999, for example.

Likewise, second ad-hoc group participant 208B is named Laura Bradley, has a page on social network B (SNB), and accepts SMS messages on her smart phone, which has the telephone number (555) 304-6691. In this example, system 100 gave her the alias name "Participant 2" or "P2", provides proxy URL "SN2.event1.meet.org/P2" for her page on social network B and the telephone number (888) 211-0002 for text messaging.

The example embodiment in FIG. 2 is for illustrative purposes only and is not intended to be limiting. Other types of information may be collected and used for each participant. For example, in one embodiment, rather than creating an individual alias for each email system used by a participant, a single generic email alias may be generated and provided to other members of the group. Email sent to the participant at the generic email alias would be received by system 100, which then maps the email alias to one or more individual email addresses used by the participant. Likewise, rather than creating an individual alias for each social network that a participant uses, a single generic social networking alias may be created, where system 100 receives messages or posts directed to the participant's generic social network alias and performs the necessary translations needed to map the incoming messages into messages appropriate to the participant's actual social network. Alternatively, system 100 may set up its own proxy social networking site that incorporates features of the real social networking sites; group members would then have their own page on the proxy social networking site which they could visit to get status updates on group or event activity. In this manner the participants can be assured that their actual identities or social network URLs will not be shared intentionally or accidentally with other members of the ad-hoc group.

Other forms of organization of the data stored in database 106 may be used, as well. The subject matter described herein is not limited to the event=>participant=>info hierarchy shown in FIG. 2.

Figure 3:
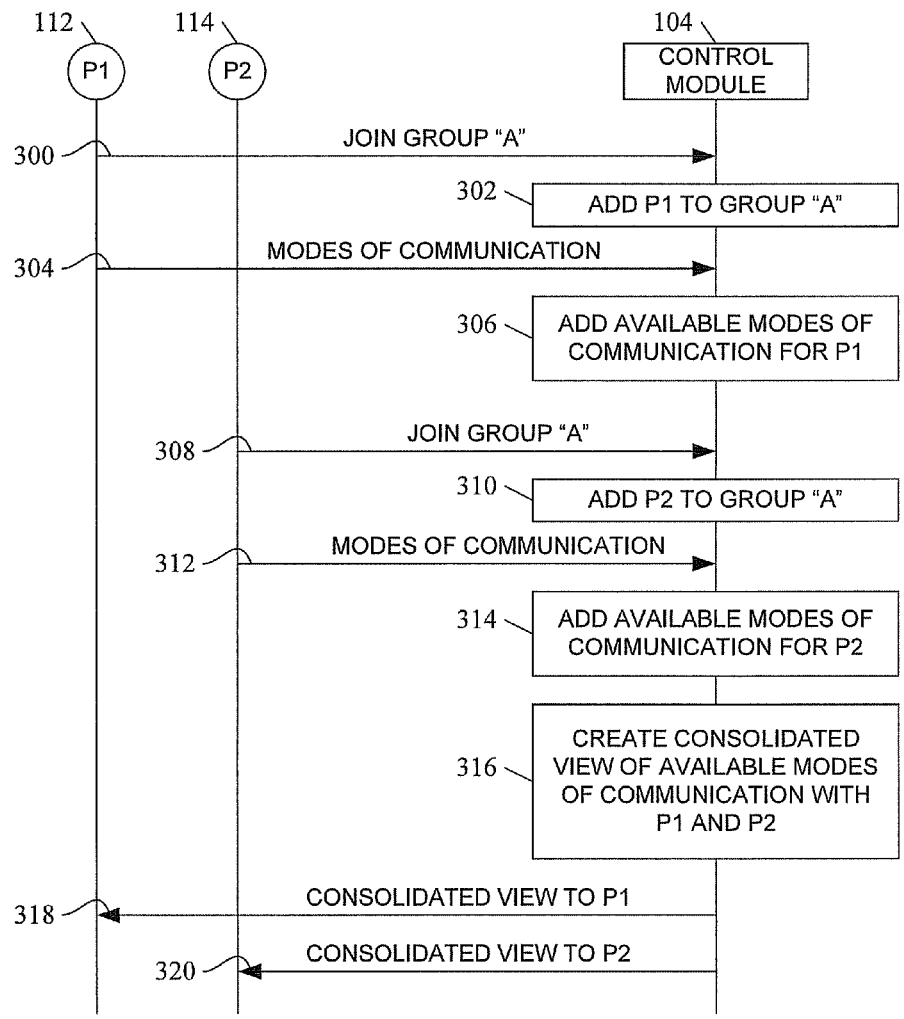
FIG. 3 is a signaling message flow diagram illustrating exemplary signaling messages exchanged during operation of a system for creating and managing ad-hoc groups linked to an event and spanning multiple modes of communication according to an embodiment of the subject matter described herein.

FIG. 3 is a signaling message flow diagram illustrating exemplary signaling messages exchanged during operation of a system for creating and managing ad-hoc groups linked to an event and spanning multiple modes of communication according to an embodiment of the subject matter described herein. In the embodiment illustrated in FIG. 3, a first participant P1 112 sends a message 300 to system 100 requesting to join an ad-hoc group, group "A". In one embodiment, message 300 is received at communication interface 102, which forwards the message to control module 104. For simplicity of description, messages received by and sent from system 100 via communications interface 102 will hereinafter be said to be received by or sent from control module 104. At block 302, control module 104 adds P1 112 to group A. In one embodiment, control module 104 stores a record of P1's membership, such as in database 106 or entity for storing data.

In one embodiment, P1 112 may send to control module 104 a list of the available modes of communication with P1 112. For example, P1 112 may send this information to control module 104 via a message 304, or it may send this information as part of the original join request 300. P1 112 may send message 304 on its own initiative, as shown in FIG. 3, or in response to a request for such information from control module 104. At block 306, control module 104 stores this information, such as by adding the available modes of communication for P1 112 to information that control module 104 stores for each participant, such as in participant record 208A shown in FIG. 2. In one embodiment, control module 104 receives first information from P1 112, generates corresponding second information, and stores both the first and second information in database 106. Participant information 208A is an example of the first and second information for participant P1 112 that may be stored in database 106.

In the embodiment illustrated in FIG. 3, a second participant, P2 114, also sends a join request 308 to control module 104, which adds P2 114 to group A at block 310. Control module 104 then receives a message 312 listing the available modes of communication with P2 114, and, at block 314, adds the available modes of communication to the information that control module 104 is maintaining about P1 114. In one embodiment, control module 104 receives first information from P2 114, generates corresponding second information, and stores both the first and second information in database 106. Participant information 208B is an example of the first and second information for participant P2 114 that may be stored in database 106.

At block 316, control module 104 creates a consolidated view of available modes of communication with each member of group A. In the embodiment illustrated in FIG. 3, the view created by control module 104 will list all of the different ways that participants may communicate with P1 112 and P2 114. This consolidated view is then provided to each of the participants of group A, which in this example include P1 112 and P2 114. This is shown as data transmissions 318 and 320, respectively.

Thus, a mechanism is presented to enhance communications associated with a scheduled event. When the mechanism is initiated, information on each event participant's communications services, subscriptions, preferences, and presence is collected. This information is then aggregated to provide a consolidated view of potential communications mechanisms with all event participants. Presenting this information in a consolidated fashion creates a context for the communication options, and allows all event participants to easily communicate with one or more of the other participants. The communication method used can be different for each event participant, making it possible to choose the optimum communication mechanism for each participant.

The mechanism described here can be initiated in several ways, including as part of the event setup, as part of the event "reminder", at the start of the event, or at any point during the event. The mechanism can be initiated manually, or automatically by the application that schedules the event.

In one embodiment, a given participant may be a member of more than one ad-hoc group. Likewise, there could be multiple overlapping ad-hoc groups associated with a single event, and a single ad-hoc group could be associated with multiple events.

There are many types of events to which the subject matter described herein may apply, including appointments, meetings, or other scheduled events, conferences and teleconferences, webinars, or other scenarios involving two or more participants. In general, an event may be characterized by a start date or time, a duration or an end date or time, and/or a list of participants. The list of participants may or may not be limited to invited or registered participants. An event may be a shared action item. An event may be recorded as an entity in an electronic database. Other examples of events include a unified communication (UC) push to a group.

In some scenarios, the concepts of "event" and "group" may be so interrelated that the terms become synonymous. For example, the example data structure described in FIG. 2 associates members of a group to an event that has a definite start and end time, but from the perspective of the members themselves, they may consider themselves as having joined a group rather than having signed up to an event. Where the ad-hoc groups are created for the purpose of allowing free communication between participants for a period of time but preventing communication between participants after the period of time has ended, the event around which the group membership is organized can be thought of conceptually as defining the temporal limits of the ad-hoc group's existence.

On the other hand, an ad-hoc group may be created for the same purpose, i.e., enabling communication for some period of time but yet making subsequent communication impossible, without being explicitly tied to a particular event per se, but having a duration or window of communication defined at the whim of the event creator(s) or administrator(s). For example, an ad-hoc group may be created for the purpose of anonymous communication for an unspecified period of time, e.g., until the group creator dismantles the group or all group members have unsubscribed from the group, etc.

Thus, the descriptions herein may describe an action or condition as relating to an event or to a group, according to what seems most natural in the particular context.

Figure 4A:
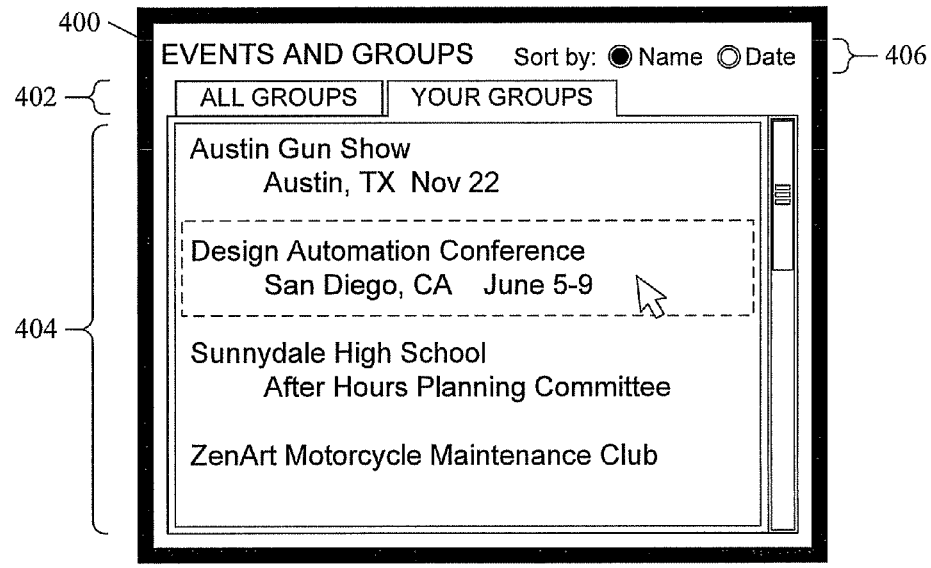
FIGS. 4A, 4B, and 4C are computer screen shots illustrating different views of an exemplary consolidated view of the available modes of communication with each of the other participants in the group according to an embodiment of the subject matter described herein.
Figure 4B:
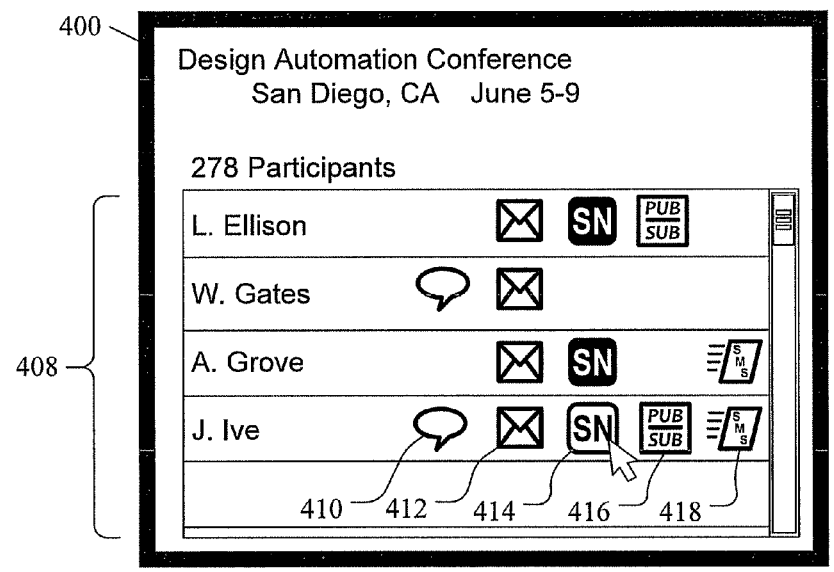
Figure 4C:
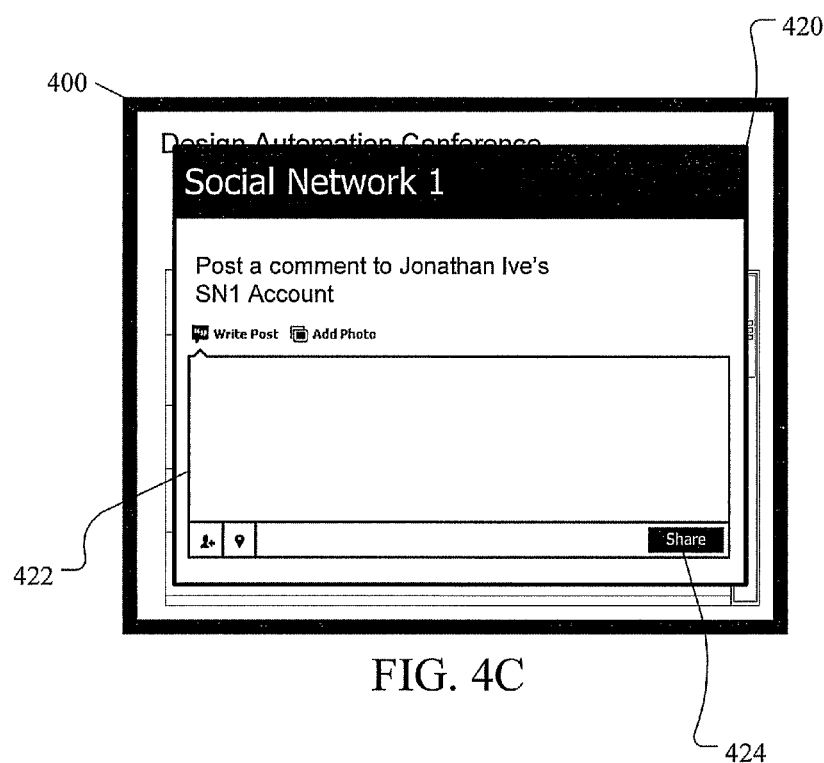

FIGS. 4A, 4B, and 4C are computer screen shots illustrating different views of an exemplary consolidated view of the available modes of communication with each of the other participants in the group that may be generated by system 100 according to an embodiment of the subject matter described herein.

FIG. 4A is a computer screen shot illustrating an exemplary consolidated view showing a list of available ad-hoc groups according to an embodiment of the subject matter described herein. In the embodiment illustrated in FIG. 4A, view 400 has two tabs 402 which allow the user to display all available groups or to display only those groups which the user has joined. As described above, the concept of "group" and "event" may be somewhat interchangeable. Thus, in one embodiment, view 400 may have tabs listing events rather than, or in addition to, tabs listing groups. In FIG. 4A, the user has elected to display only those groups to which the user is a participant, and these groups are shown in a scrolling list 404. In one embodiment, an ad-hoc group may be associated with a particular event, in which case the list of groups 404 may show not only the name of the group but also the date of the event. In one embodiment, the list of groups 404 may be sorted by name, date of event (for event-related groups), number of participants, most recently active, or other sorting options, by using a sort selection 406. In the embodiment illustrated in FIG. 4A, the user has selected the group "Design Automation Conference", such as by clicking on the name of the group in list 404, this causes information about the group to be displayed, such as shown in FIG. 4B.

FIG. 4B is a computer screen shot illustrating an exemplary consolidated view showing a list of participants in an ad-hoc group according to an embodiment of the subject matter described herein. In the embodiment illustrated in FIG. 4B, there are 278 participants in the ad-hoc group organized around the Design Automation Conference to be held in San Diego, Calif. from June 5th through June 9th. A scrolling list of participants 408 is displayed. In one embodiment, the list includes the participant's name followed by a list of available modes of communication by which the participant may be contacted or reached. In the embodiment illustrated in FIG. 4B, for example, a list of icons indicating various different modes of communication with the participant appears to the right of each participant's name.

In the embodiment illustrated in FIG. 4B, the list includes a participant named "Jonathan Ive", whose name is followed by a list of icons including an icon for an instant message, chat, or VoIP service 410, an icon for an email service 412, an icon for a social network 414, an icon for publication/subscription, or "pub/sub" service 416. The user wants to post something to Jonathan Ive's social network wall or homepage and has clicked on the social network icon 414. In response, the user may be presented with a form which the user may use to post a message to Jonathan Ive's social network page, such as is shown in FIG. 4C.

FIG. 4C is a computer screen shot in which the consolidated view is overlaid with a user interface for allowing one participant to post a message to another participant via the other participant's social network. In the embodiment illustrated in FIG. 4C, consolidated view 400 displays a pane 420 for sending a message to the other participant's account on a social network. Pane 420 includes a text field 422 into which the first participant may type a message. Once the message has been entered it may be sent by clicking on a button 424. After the message is successfully sent, pane 420 may disappear and the view 400 may return to its appearance in FIG. 4B. The particular messages that may be sent as part of this transaction are shown in FIG. 5.

Figure 5:
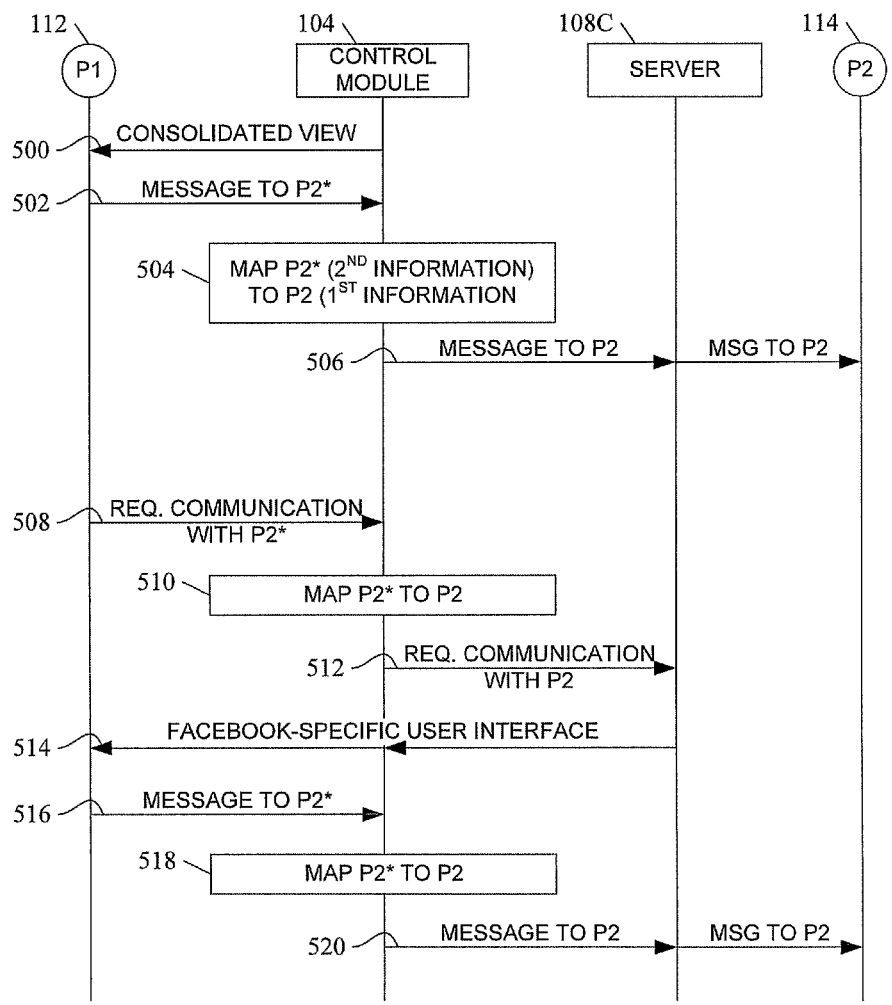
FIG. 5 is a signaling message flow diagram illustrating exemplary signaling messages exchanged during operation of a system for creating and managing ad-hoc groups linked to an event and spanning multiple modes of communication according to an embodiment of the subject matter described herein.

FIG. 5 is a signaling message flow diagram illustrating exemplary signaling messages exchanged during operation of a system for creating and managing ad-hoc groups linked to an event and spanning multiple modes of communication according to an embodiment of the subject matter described herein. Examples of messages include but are not limited to emails, SMS/MMS messages, posts to a forum or wall of a social network, and the like.

The signaling message flow diagram shown in FIG. 5 begins with control module 104 providing a consolidated view to a first participant P1 112 of a group (message 500.) For example, P1 112 may see a view such as the one shown in FIG. 4B. P1 112 attempts to send a message to another participant, P2 114. However, P1 doesn't know the second participant's real identity, but instead only knows the second participant's alias. In the embodiment illustrated in FIG. 5, the term "P1" represents the first participant's real identity/email address/social network page URL, etc., and the term "P1*" represents the alias for that identity/address/URL that was created by control module 104. Likewise, "P2" represents the second participant's actual identity and "P2*" represents the second participant's alias. In one embodiment, the actual identity is stored by control module 104 as the participant's "first information" and the alias is stored by control module 104 as the participant's "second information".

Thus, when P1 112 attempts to send a message to P2, the message 502 is actually sent to P2*, which is an address owned by control module 104. Thus, message 502 is received by control module 104 instead of by P2 114 or even P2's social network account. Control module 104 receives message 502, detects that it was addressed to P2*, and determines that P2* is the second information for participant P2. Thus, in block 504, control module 104 maps second information P2* to first information P2, and forwards or redirects the message to the proper destination, shown as message 506, which is received by the social network's server 108C and presented to participant P2 114 as an incoming message.

In another embodiment, the second participant's social network may provide a customized or branded user interface to control module 104 so that it appears to the first participant that he or she is directly communicating to the second participant instead of to an alias of the second participant. For example, P1 112 may send to control module 104 a message 508 requesting communication with P2 114, who is known to P1 112 only by his alias, P2*. Control module 104 receives the request 508 and, at block 510, maps the alias P2* to the actual identifier P2. Control module 104 then generates a new request 512 and sends it to P2's social network 108B, identifying P2 114 by his or her actual account name. In one embodiment, request 512 is received by server 108C, which then provides control module 104 with a form having the social network's logo and/or the social network's look and feel, shown as message 514, which control module 104 then presents to P1 112. P1 112 may use that form to send a message 516 to P2*, which is received by control module 104. At block 518, control module 104 changes the destination of the message from the alias P2* into the actual address P2, and sends the modified message 520 to P2 114. In one embodiment, message 520 may go to P2 114 via P2's social network 108B. In the embodiment illustrated in FIG. 5, message 520 is received by server 108C. Alternatively, message 520 may bypass social network 108B and go to P2 114 directly. This is the scenario illustrated in FIG. 4C, where display pane 418 includes the social network's logo and other graphic elements.

Figure 6:
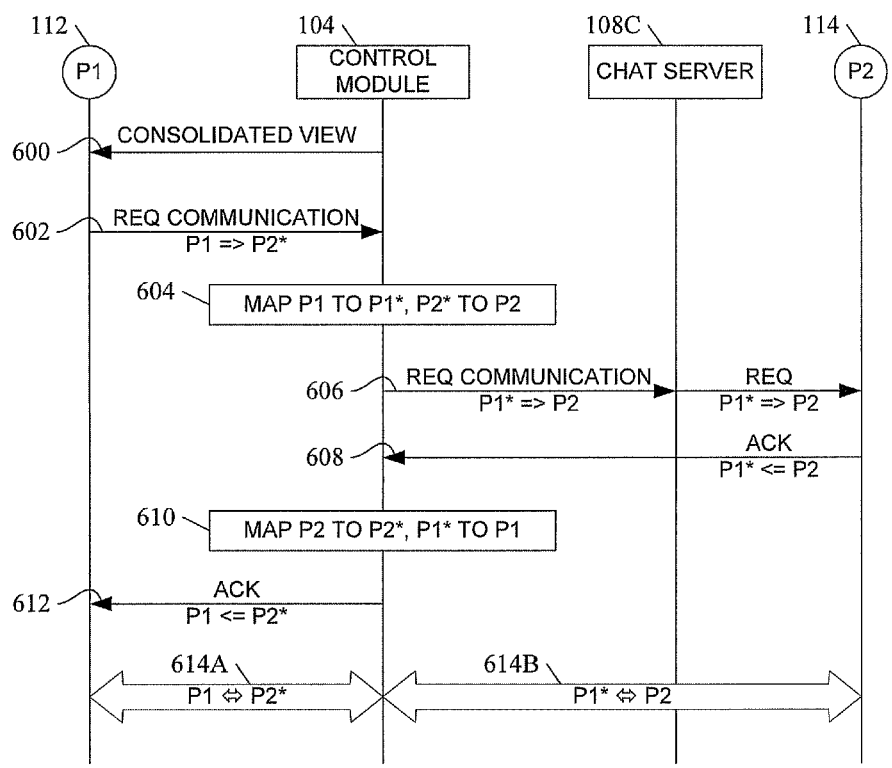
FIG. 6 is a signaling message flow diagram illustrating exemplary signaling messages exchanged during operation of a system for creating and managing ad-hoc groups linked to an event and spanning multiple modes of communication according to yet another embodiment of the subject matter described herein.

FIG. 6 is a signaling message flow diagram illustrating exemplary signaling messages exchanged during operation of a system for creating and managing ad-hoc groups linked to an event and spanning multiple modes of communication according to yet another embodiment of the subject matter described herein. Specifically, FIG. 6 illustrates an embodiment in which a two-way communication is established between two participants in an ad-hoc group in such a way that neither participant has knowledge of the other participant's actual contact information (e.g., name, email address, URL, etc.) Example modes of communication include but are not limited to chat sessions, VoIP calls, instant text messaging, and the like.

In the embodiment illustrated in FIG. 6, first participant P1 112 sees second participant P2 114 listed as a group member in the consolidated view provided via data transmission 600 by control module 104. For example, P1 112 may see from the consolidated view that P2 114 may be contacted via an instant message, chat, or VoIP client. In this scenario, P1 112 may click on the VoIP service icon next to P2's name, which triggers a request for communication 602 from P1 112 to P2 114. This request 602 is received by control module 104, which determines that the request is sent from P1 112 (e.g., the request may include P1's actual identity), and sends the request to P2 114, taking care to obscure P1's true identity by mapping P1 to P1*, as shown in block 604. A new request 606 is sent to the intended target P2 114, identified by P2's actual address.

In one embodiment, the consolidated view is provided by a client app executing on a smart phone, personal computer, or other processing device owned or used by P1 112. In this case, request 602 may include the alias of the second participant, P2*, so that the user of the device from which request 602 was sent has no opportunity to use packet traps or other snooping technologies to search the outgoing message for the actual address of P2 114. In other words, the consolidated view provided by control module 104 only includes second information for each participant in the group. Request 602 may include an address for P2 114, but it will be an alias for P2 114 (i.e., "P2*"), rather than the actual address for P2 114. In this embodiment, at block 604 control module 104 also maps the received alias P2* to the actual address P2 before sending request 606.

In an alternative embodiment, however, the consolidated view is provided by control module 104 or a network server associated with control module 104, such as a web page with clickable icons. In this case, request 602 is in the form of a mouse click, and control module 104 determines that communication with P2 114 is desired and generates outgoing request 606 without having to map an alias, such as P2*, into an actual address, such as P2.

In the embodiment illustrated in FIG. 6, request 606 is received by server 108C, which hosts a chat service or other two-way communication service. Server 108C may reserve resources necessary for the communication, if any, and forward the request to P2 114. P2 114 accepts the invitation to establish communication, and, in reply, sends an acknowledge message ACK 608 to control module 104. In one embodiment, ACK 608 includes source information ("P2") and destination information ("P1*"), since P2 114 only knows the first participant's alias (i.e., "P1*") and doesn't know the first participant's actual address (i.e., "P1".) Control module 104 receives ACK 608, and at block 610, maps P2 to P2* and P1* to P1, and sends the modified ACK 612 to P1 112. A communication channel 614, which may include both signaling plane traffic and media or bearer plane traffic, is then established between P1 112 and P2 114. However, since each party knows the other party only by the other party's alias, the communication channel goes through control module 104, which maps aliases to or from actual addresses as required. Thus, the communication channel is conceptually divided into two legs: a first leg 614A, which is a communication between P1 112 and alias P2* 114, and second leg 614B, which is a communication between P2 114 and alias P1* 112.

FIG. 7 is a computer screen shot illustrating an exemplary consolidated view of the available modes of communication with each of the other participants in the group that may be generated according to another embodiment of the subject matter described herein. In contrast to the consolidated view shown in FIG. 3A, for example, in which next to each participant's name there is only a set of icons which are used to contact or establish communication with other participants, the embodiment illustrated in FIG. 7 shows the second information, i.e., the alias contact information for each mode of communication with the other participants. In one embodiment, consolidated view 700 includes a list of participants 702. For each participant, list 702 displays the participant's name, an icon representing an available mode of communication, and, to the right of the icon, the alias or second information that control module 104 created for that available mode.

In the embodiment illustrated in FIG. 7, for example, list 702 includes a participant named "Buffy S." Buffy's available modes of communication include an email account, a social network page, and a pub/sub account, shown by the three icons below her name, respectively. Next to the email icon 704 is an email address, "Buffy@SunnydaleHS.org." Next to the social network icon 706 is a URL, "SN.SunnydaleHS.org/BSummers." Next to the pub/sub icon 708 is another URL "PS.SunnydaleHS.org/Buffy." In other words, in the embodiment illustrated in FIG. 7, control module 104 hosts or has reserved the domain names "*.SunnydateHS.org" or use by group members. When each participant joins the group, control module 104 generates, assigns, or registers an email address or URL in the SunnydaleHS.org domain. Thus, if another participant, such as Willow Rosenberg, wants to send an email to Buffy, Willow may use any device—not just the application that displays the consolidated view—to send an email to Buffy's address "Buffy@SunnydaleHS.org." Since the "SunnydaleHS.org" domain is mapped to control module 104, Willow's email will be received by control module 104, which will then forward the email to Buffy's actual email address. Control module 104 will obscure Willow's actual email address by modifying the original email header to show Willow's alias email address, "Willow@SunnydaleHS.org." In this manner, Buffy will receive an email to Buffy's actual email address, but the return address will point not to Willow's actual email address, but to Willow's alias email address at control module 104.

Figure 8:
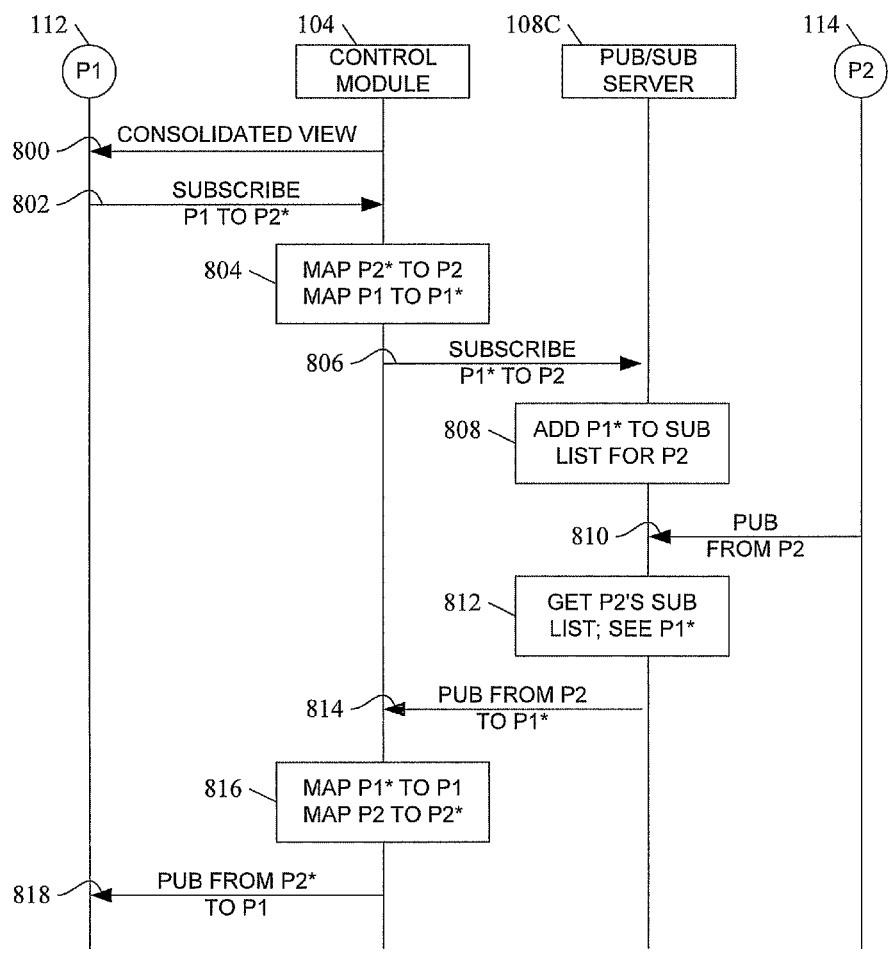
FIG. 8 is a signaling message flow diagram illustrating exemplary signaling messages exchanged during operation of a system for creating and managing ad-hoc groups linked to an event and spanning multiple modes of communication according to yet another embodiment of the subject matter described herein.

FIG. 8 is a signaling message flow diagram illustrating exemplary signaling messages exchanged during operation of a system for creating and managing ad-hoc groups linked to an event and spanning multiple modes of communication according to yet another embodiment of the subject matter described herein. In the embodiment illustrated in FIG. 8, the second participant's social network 108B provides a publish/subscribe service, such as Twitter™, which is hosted by server 108C. Data transfer 800 represents control module 104 providing to first participant P1 112 a consolidated view which displays second participant P2 114 and an icon which, if clicked, will subscribe P1 112 to receive P2 114's publications.

P1 112 clicks on the subscription request icon, causing a subscription request 802 to be sent to control module 104. Message 802 is a request to add first participant P1 as a subscriber to the tweets of P2*. Control module 104 receives the request, and, at block 804, maps first information P1 to second information P1*, maps second information P2* to first information P2. Control module 104 then forwards the modified subscribe request 806 to pub/sub server 108C. Pub/sub server 108C receives request 806 and adds P1* to the subscription list for P2, as shown in block 808.

At some point in the future, second participant P2 114 publishes a message 810, e.g., by using a pub/sub client. This message, which is herein referred to as "a publication", is sent to pub/sub server 108C, which retrieves the subscription list for P2 and determines that P1* is on the list (block 812), and sends a copy of the publication 814 to P1*. Since P1* is an alias for P1 112, the copy of the publication 814 is received by control module 104, which maps P1* to P1 and maps P2 to P2* (block 816) before sending the modified publication 818 to P1 112.

In each of the examples shown above, including the embodiments illustrated in FIGS. 5, 6, and 8, the concepts illustrated therein apply in both directions, and may occur simultaneously. In FIG. 5, for example, shows P1 112 sending a message to P2 114, but the same principle would apply if P2 114 sent a message to P1 112. A first participant could be communicating with a second participant via one mode of communication while the second participant could be communicating with the first participant via the same mode of communication of via a different mode of communication. Likewise, multiple modes of communication could occur simultaneously, and the modes of communication may include modes other than the few examples (e.g., Facebook™, Twitter™, Google Talk™, etc.) described herein.

Figure 9:
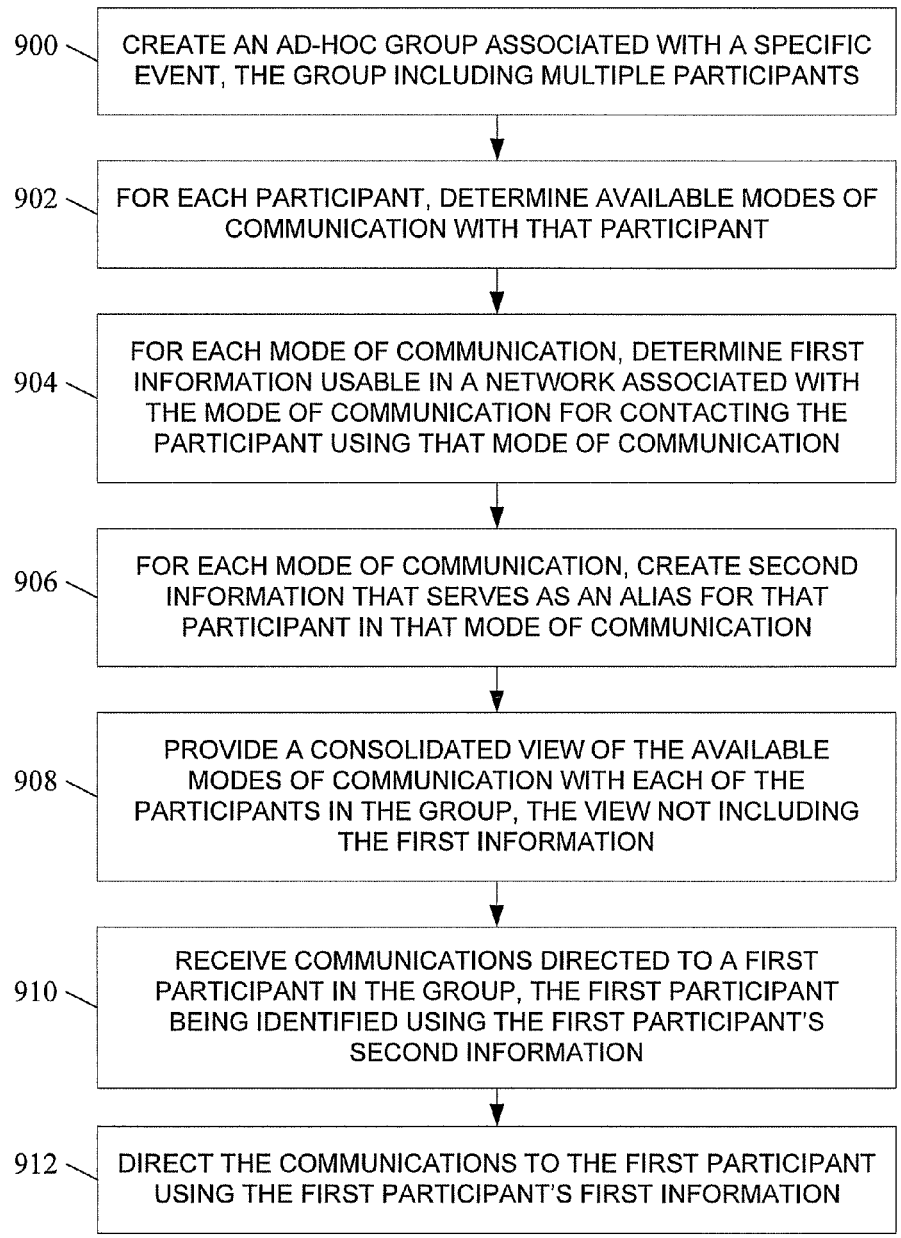
FIG. 9 is a flow chart illustrating an exemplary process for creating and managing ad-hoc groups linked to an event and spanning multiple modes of communication according to an embodiment of the subject matter described herein.

FIG. 9 is a flow chart illustrating an exemplary process for creating and managing ad-hoc groups linked to an event and spanning multiple modes of communication according to an embodiment of the subject matter described herein. In one embodiment, this process may be performed at a control module having a hardware processor. In the embodiment illustrated in FIG. 9, the process includes, at block 900, creating an ad-hoc group associated with an event, the group including multiple participants. At block 902, for each participant in the group, available modes of communication with the participant are determined. At block 904, for each mode of communication, first information usable in a network associated with each mode of communication for contacting the participant in the corresponding mode of communication is determined. At block 906, for each mode of communication, second information that serves as an alias for the participant is created or generated. At block 908, a consolidated view of the available modes of communication with each of the participants in the group is provided to each participant in the group. In one embodiment, the consolidated view includes, displays, or otherwise makes available the second information. The consolidated view does not include the first information. At block 910, communications directed to a first participant in the group are received, where the first participant is identified using the first participant's second information. At block 912, the received communications are directed or redirected to the first participant, where the first participant is identified using the participant's first information.

Figure 10:
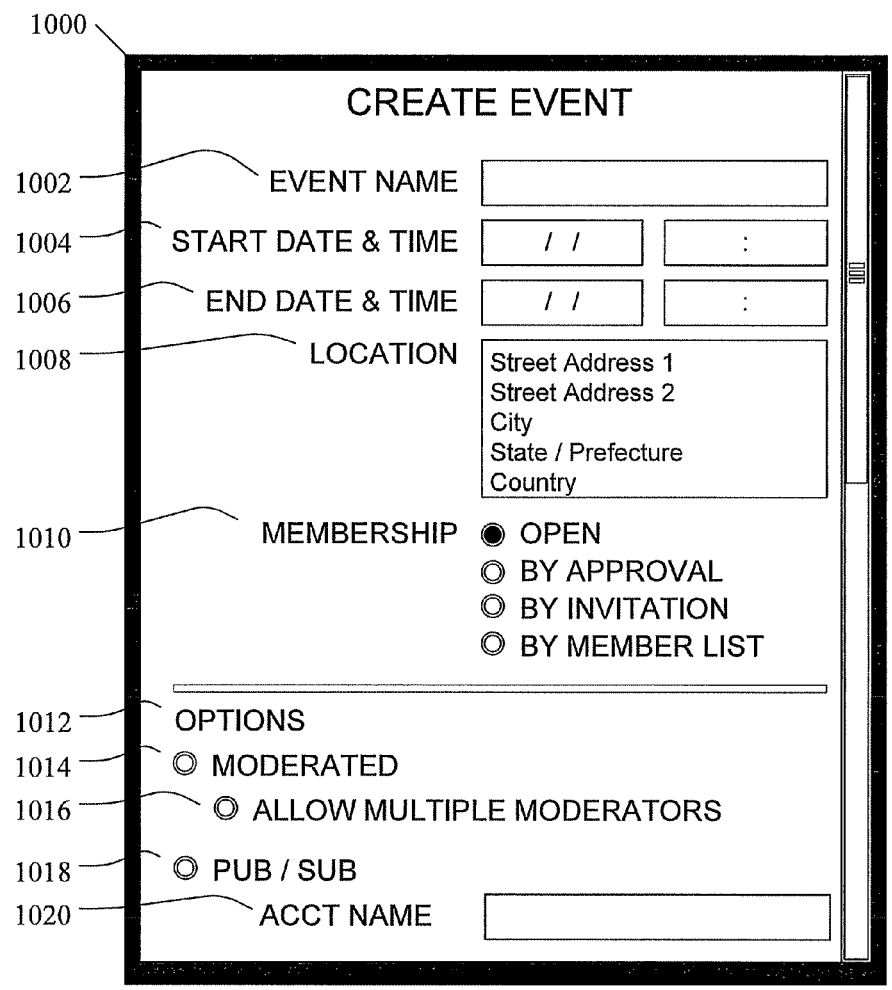
FIG. 10 is a computer screen shot illustrating an exemplary consolidated view showing a pane for creating an ad-hoc event according to an embodiment of the subject matter described herein.

FIG. 10 is a computer screen shot illustrating an exemplary consolidated view showing a pane for creating an ad-hoc event according to an embodiment of the subject matter described herein. In the embodiment illustrated in FIG. 10, a create event pane 1000 has entry fields into which may be entered information describing the event, such as the event name 1002, the event start date and time 1004, the event end date and time 1006, and the event location 1008.

In one embodiment, the event creator may determine who may or may not join the ad-hoc group associated with the event. In the embodiment illustrated in FIG. 10, membership options 1010 allow membership in the ad-hoc group to be set to one of the following: "open", meaning that anyone may join the ad-hoc group without restriction; "by approval", meaning that the event administrator(s) may review requests to join the ad-hoc group and grant or deny those requests; "by invitation", meaning that only those people to whom the event administrator sends an invitation will be allowed to join the ad-hoc group; and "by member list", meaning that the event administrator creates a list of allowed participants but does not send an invitation, e.g., the participant must initiate the request to join. The membership types described above are intended to be examples only and are not limiting.

In one embodiment, create event pane 1000 may allow the event creator to designate a moderator or moderators to exert control over some or all of the communications between group members. In one embodiment, for example, a social networking page or account may be set up for each event or ad-hoc group so that group members have a "wall" onto which they may post comments or a forum for discussions of various topics, and so on. In this scenario, a designated moderator may review and approve posts to the wall or comments to the forum before they are made available for viewing by other group members, may remove or edit inappropriate comments, and so on. Thus, in the embodiment illustrated in FIG. 10, an options section 1012 includes an option 1014 for defining whether the group is moderated or unmoderated. Another option 1016 defines whether the group may or may not have multiple moderators.

In one embodiment, each event or ad-hoc group may be associated with a pub/sub account, which may be used by the group administrator to send messages, updates, and reminders to all members of the group that choose to subscribe. In the embodiment illustrated in FIG. 10, create event pane 1000 includes an option 1018 for defining whether the event is associated with a pub/sub account and a field 1020 for entering information about that account.

The example data that may be associated with an event or ad-hoc group shown in FIG. 10 is for illustrative purposes only and is not intended to be limiting. Other types of information may be associated with an event or ad-hoc group.

In one embodiment, an ad-hoc group may be associated with triggers that cause certain actions to occur. For example, the event creator or administrator may schedule a reminder email to be automatically sent to all members the day before a meeting. A trigger condition may include a date and/or time, day of week, week of month, and so on. For example, for a scheduled meeting, system 100 may attempt to establish a conference call with subscribers that have VoIP capability or a multi-person chat session with subscribers that have instant messaging capability, and so on. Likewise, when a group is organized around a scheduled event, the termination of that event may cause the group to be automatically dismantled.

Actions by a group member may be a trigger condition. For example, a group administrator may post a message to all group members, causing system 100 to attempt to immediately contact the group members according to their available modes of communication. Actions by a threshold number of group members may also be a trigger condition. For example, when all group members unsubscribe from a group, that group may be automatically dismantled. In another example, an item to be voted on may be put to the group, and the option chosen by a majority or other threshold number of members may be selected.

Figure 11:
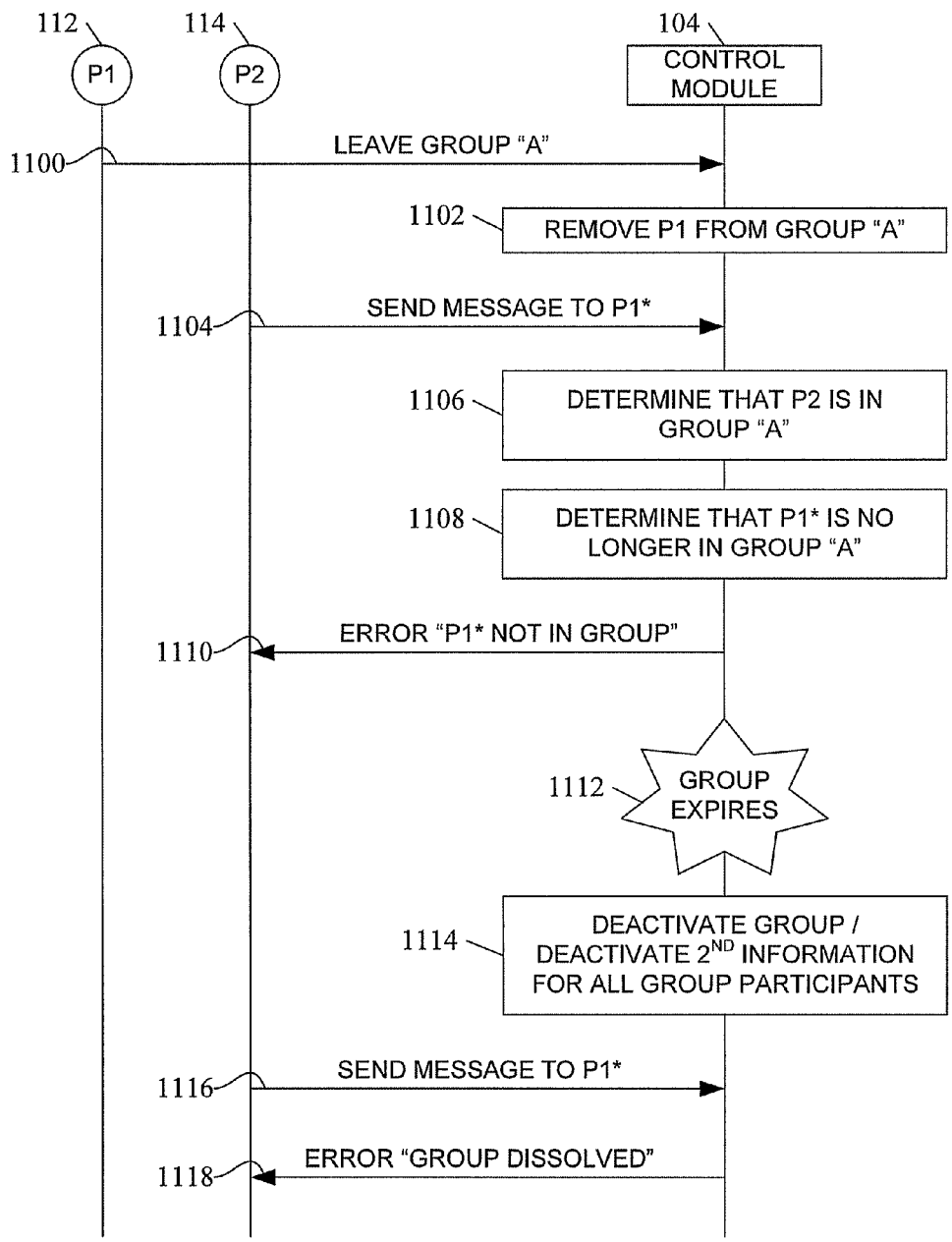
FIG. 11 is a signaling message flow diagram illustrating exemplary signaling messages exchanged during operation of a system for creating and managing ad-hoc groups linked to an event and spanning multiple modes of communication according to yet another embodiment of the subject matter described herein.

FIG. 11 is a signaling message flow diagram illustrating exemplary signaling messages exchanged during operation of a system for creating and managing ad-hoc groups linked to an event and spanning multiple modes of communication according to yet another embodiment of the subject matter described herein. FIG. 11 illustrates two kinds of termination of membership: termination of a member from an ad-hoc group, and dissolution of the ad-hoc group.

In the embodiment illustrated in FIG. 11, group member P1 112 sends a message 1100 that requests termination of membership of ad-hoc group "A". Control module 104 receives message 1100, and, at block 1102, removes P1 112 from group A. In one embodiment, control module 104 may delete participant information for P1 112 or other mark P1 112 as inactive. In the embodiment illustrated in FIG. 2, for example, control module 104 may delete participant record 208A, which contains information about P1 112, from database 106.

Sometime after P1 112 left the group, another group participant, such as P2 114 may try to communicate with P1 112. In embodiments where all communication must be initiated via the consolidated view provided by control module 104 to all participants in the group, termination of a participant's membership in the group may trigger the consolidated view to be updated to remove the terminated participant from the list of participants or otherwise show that the terminated participant has been deactivated. In other embodiments, however, participants may use the aliases originally provided by the consolidated view to communicate via means other than the consolidated view. For example, where the consolidated view originally displayed an (alias) email address for P1 112, another participant may attempt to send an email to that address even after P1 112 left the group. In the embodiment illustrated in FIG. 10, P2 114 attempts to send a message 1104 to P1 112, who is known only to P2 114 by the alias P1*.

At block 1106, control module 104 receives message 1104 and determines that the message sender, P2 114, is a member of group A. At block 1108, control module 104 determines that the intended receiver of message is P1 112 and that P1 112 is no longer in Group A, and so sends message 1110 to P2 114 to indicate that P1 is no longer part of the group.

P2 114 may be a member of multiple groups, and P1 112 may also be in multiple groups, in which case control module 104 may need to see if P1 is a member of any group that P2 is also a member of, and if so, only send an error message, such as message 1110, if there are no groups which P1 and P2 are both members of. In one embodiment, control module 104 may create separate aliases for a participant, one for each group. In this manner, control module 104 may easily determine which group P2 114 intended message 1104 to pertain to: if P2 114 sends a message to P1 using P1's alias P1*, for example, and the alias P1* is associated with group A, then control module 104 need only check P1's membership in group A. If P2 114 sends a message to P1 using another alias for P1, such as P1, which is associated with group B, then control module 104** need only check P1's membership in group B.

FIG. 11 also illustrates the process that may occur when an ad-hoc group is dismantled or dissolved. In one embodiment, an ad-hoc group may have an expiration date and/or time, and control module 104 may automatically dissolve the group accordingly. Alternatively a group may have one or more administrators with the necessary privileges to manually dissolve the group.

In the embodiment illustrated in FIG. 11, ad-hoc group A has an automatic expiration date, represented by element 1112. In response, at block 1114 control module 104 deactivates the group. This may involve deactivating or deleting second information and/or first information for all group participants. Once deactivated, control module 104 may refuse all future attempts of communication between participants of the now-deactivated group. In the embodiment illustrated in FIG. 11, for example, P2 114 attempts to send a message 1116 to P1, but control module 104 rejects the attempt. In one embodiment, control module 104 may respond with an error message 1118, which states for example that the group was dissolved. Alternatively, control module 104 may simply not respond at all.

The subject matter described herein includes several features that enhance the functionality of existing calendar programs and communications applications. In one embodiment, the subject matter described herein may access contact information from multiple programs, and combine it in a consistent fashion to provide a consolidated view of communication options, preferences and status. This intuitively identifies the most effective way to communicate with single or multiple event participants.

In one embodiment, the subject matter described herein may determine that event participants have other social networking personas that are part of the communications matrix, and associate these other personas with the event participant. This association could be configured to be automatic, (if the social network allowed it) or to require explicit acceptance.

In one embodiment, the subject matter described herein may create ad-hoc groups with all event participants or selected participants. In one embodiment, the subject matter described herein may quickly initiate communications with event participants using the communications technology of choice, or with a combination of communication services or social networks, depending on the context determined by this method. The subject matter described herein may include the ability to use a number of different communication services or social networks for a single message. Communication could be with a single event participant, with multiple event participants, or with the members of an ad-hoc group.

In one embodiment, the subject matter described herein may include social networks in the communications options, and to allow participants to "follow" other event participants for the duration of the event.

In one embodiment, the subject matter described herein may ensure that associations established in the context of the event do not reveal any security information or violate a participant's privacy. For example, if someone accepted a "friend-request" in the context of a given event, the association would be established by the "event". This ensures that participants would not be able to continue seeing information after the end of the event, nor see information that was generated outside the context of the event.

In one embodiment, the subject matter described herein may ensure that ad-hoc groups associated with an event are temporally linked to the event. All linkages created in the context of the event can be automatically and reliably terminated at the end of the event. System 100 may also ensure that all connections established as part of the event will automatically be removed at the end of the event. This would ensure that participants are not allowed to continue following other participants at the end of the event, to avoid "clutter" in your contact list, and to provide additional security and privacy.

Setup. Users typically are required to log into communications services that they use, whether it be over the top (OTT) services, in which content delivery uses an alternative means rather than the main delivery infrastructure, session initiation protocol (SIP) telephony, or social networks. In one embodiment, this login could occur through a blended communications client that included pre-configured identities and login credentials associated with the communication services used by those identities. Alternatively, the user may manually log into each communication service. Users may also specify relevant information for a particular event, such as time, location, and participants. In one embodiment, this information could be entered directly by the user, or it could be automatically transferred from an event application, such as a calendar.

Initiation. In one embodiment, the mechanism is initiated at a predetermined time associated with an event. Initiation could be when the event is scheduled, when an event reminder is received, at the beginning of the event, or at any time during the event. In one embodiment, during initiation a information related to event participants and their communications services may be presented to a user, e.g., in a display window presented to the user.

Filtering and display. In one embodiment, the mechanism may present a view of the communications matrix for the selected event. As used herein, the term "communications matrix" refers to the display of information associated with an event, usually organized graphically for ease of comprehension. The information contained in the communications matrix can be filtered to present various different views of the communications associated with the event. These include:

Participants: a list of event participants, along with an indication of communications services they subscribe to (phone, IM, Text, social networks, etc.). The list would also indicate the participants' presence status in each system.

Ad-hoc group: a list of the participants in a given ad-hoc group can be presented, highlighting the communication options for the each member of the group. The list would also indicate the participants' presence status in each system.

Application: by selecting one specific communication service or application, this function can limit the display to those event participants who subscribe to the selected communication service. This view can be further filtered, for example, to display users who are currently signed on to the service, or to display those users who are currently active in the application.

Other criteria: the view could also be filtered according to other criteria, such as belonging to the same company, the means of accessing the event (e.g. people who join a web conference over a low speed connection), or users who enter a special password to enter the event. These criteria could be used to automatically initiate communication, or to auto generate ad-hoc groups.

Communication. The mechanism includes the ability to initiate communications with a given event participant, or with multiple participants. It is also possible to communicate with all event participants at the same time. For example, it would be possible to send an instant message to all participants who had not yet confirmed they would attend the event. An important capability of the mechanism is the ability to generate communications that involve multiple communication services or social networks with a single action.

Groups. The mechanism includes a means to combine selected event participants into an ad-hoc group to facilitate easier communications. Members of an ad-hoc group can be reached by sending a single "message", involving one or more communications service, to the group. Any action that can be applied to a single event participant, can also be applied in a similar fashion to the ad-hoc group. Ad-hoc groups can exist for the full duration of an event, or they can be terminated before the event ends. Ad-hoc groups can be generated manually or automatically based on specified criteria.

By coordinating all associations through a trusted Event Communications Matrix, event participants can ensure their confidential information is protected, and that unauthorized people do not have access to their social network after the end of the event.

Subscriptions. The mechanism includes the ability for event participants to "subscribe" to one or more event participants in the context of specific social networks. For example, an event participant could request that another participant add him as a FB friend for the duration of the event. Similarly, the participant could ask to be added as a friend for event participants, or for the members of an ad-hoc group. Subscriptions could be on a bilateral basis (between two participants) or could be a matrix subscription between some or all members of the event or an ad-hoc group. A matrix subscription could be set up by subscribing the event, or the ad-hoc group, to the specific social network. The mechanism includes a number of capabilities that are central to this function, including:

A method to subscribe to a participant's social network without exchanging confidential information between participants. This is done by creating a subscription for the event and exchanging the event credentials, including all relevant alias credentials, rather than the credentials for the individual event participants.

A method to limit the subscription authorization so that it does not extend beyond the event duration, or after the ad-hoc group has been closed.

Termination. The mechanism includes a function that ensures that communications linkages associated with an event are terminated when the event finishes. Because no credential information is exchanged between event participants, the privacy of each participant can be protected. This function can exist in a client implementation, but there would be limits to the privacy that could be provided, or to the communications services that it would support.

Advantages over the prior art include:

Improved user experience by aggregating communications across multiple communications services to present a consolidated communications matrix.

Improved efficiency by allowing users to communicate with multiple event participants with a single action Improved user experience by allowing multiple communications services across multiple platforms, to be invoked in a consolidated fashion with a single action.

Improved confidentiality, by allowing users to initiate social networking with other event participants, but to limit the sharing to the duration of the event.

Improved security by not exchanging social networking information directly between participants.

Improved conferencing capability that can be combined with enterprise solutions.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for creating and managing ad-hoc groups linked to an event and spanning multiple modes of communication, the method comprising:
    creating an ad-hoc group associated with an event, the group comprising a plurality of participants;
    determining, for each participant in the group, available modes of communication with the participant;
    determining, for each mode of communication, first information usable in a network associated with each mode of communication for contacting the participant in the corresponding mode of communication;
    creating, for each mode of communication, second information that serves as an alias for the participant;
    providing a consolidated view of the available modes of communication with each of the participants in the group, the view not including the first information; and
    receiving communications directed to a first participant in the group, the first participant being identified in the communications using the first participant's second information, and directing the communications to the first participant using the participant's first information;
    wherein the communications directed to the first participant in the group is generated by a second participant in the group; and
    wherein redirecting the communications to the first participant comprises:
        determining whether the communications includes the second participant's first information; and
        in response to determining that the communications includes the second participant's first information, modifying the communications to replace the second participant's first information with the second participant's second information before redirecting the modified communications to the first participant.

2. The method of claim 1 wherein the consolidated view of the available modes of communication includes a mode of communication for each of a plurality of different social networks.

3. The method of claim 1 wherein the consolidated view includes at least some of the second information.

4. The method of claim 1 comprising terminating the first participant's membership in the ad-hoc group.

5. The method of claim 4 comprising at least one of:
ceasing to redirect communications to the first participant;
ceasing to accept communications from the first participant; and
discarding or deleting the first participant's first or second information.

6. The method of claim 1 comprising dismantling the ad-hoc group and dismantling or deactivating communications to or from the participants.

7. The method of claim 6 comprising discarding or deleting the participants' first or second information.

8. A method for creating and managing ad-hoc groups linked to an event and spanning multiple modes of communication, the method comprising:
creating an ad-hoc group associated with an event, the group comprising a plurality of participants;
determining, for each participant in the group, available modes of communication with the participant;
determining, for each mode of communication, first information usable in a network associated with each mode of communication for contacting the participant in the corresponding mode of communication;
creating, for each mode of communication, second information that serves as an alias for the participant;
providing a consolidated view of the available modes of communication with each of the participants in the group, the view not including the first information; and
receiving communications directed to a first participant in the group, the first participant being identified in the communications using the first participant's second information, and directing the communications to the first participant using the participant's first information;
wherein the available modes of communication with the participant include a first mode of communication that uses a first social network and a second mode of communication that uses a second social network that is different from the first social network.

9. The method of claim 1 wherein determining available modes of communication with the participant, and determining, for each mode of communication, first information usable in a network associated with each mode of communication for contacting the participant in the corresponding mode of communication comprises retrieving the first information from at least communications application used by the participant.

10. A method for creating and managing ad-hoc groups linked to an event and spanning multiple modes of communication, the method comprising:
creating an ad-hoc group associated with an event, the group comprising a plurality of participants;
determining, for each participant in the group, available modes of communication with the participant;
determining, for each mode of communication, first information usable in a network associated with each mode of communication for contacting the participant in the corresponding mode of communication;
creating, for each mode of communication, second information that serves as an alias for the participant;
providing a consolidated view of the available modes of communication with each of the participants in the group, the view not including the first information; and
receiving communications directed to a first participant in the group, the first participant being identified in the communications using the first participant's second information, and directing the communications to the first participant using the participant's first information;
wherein determining available modes of communication with the participant, and determining, for each mode of communication, first information usable in a network associated with each mode of communication for contacting the participant in the corresponding mode of communication comprises determining that the participant has an additional social networking persona and associating the additional persona to the participant.

11. A method for creating and managing ad-hoc groups linked to an event and spanning multiple modes of communication, the method comprising:
creating an ad-hoc group associated with an event, the group comprising a plurality of participants;
determining, for each participant in the group, available modes of communication with the participant;
determining, for each mode of communication, first information usable in a network associated with each mode of communication for contacting the participant in the corresponding mode of communication;
creating, for each mode of communication, second information that serves as an alias for the participant;
providing a consolidated view of the available modes of communication with each of the participants in the group, the view not including the first information; and
receiving communications directed to a first participant in the group, the first participant being identified in the communications using the first participant's second information, and directing the communications to the first participant using the participant's first information;
wherein redirecting the communications to the first participant using the participant's first information, comprises sending the communications to the first participant via a plurality of modes of communications using the participant's first information associated with each of the respective modes of communications.

12. The method of claim 1 wherein at least one participant in an ad-hoc group has administrative privileges that allow the participant to set up, administer, or dismantle the ad-hoc group.

13. A system for creating and managing ad-hoc groups linked to an event and spanning multiple modes of communication, the system comprising:
a communication interface for sending and receiving network messages; and
a control module coupled with the communication interface for:
creating and maintaining an ad-hoc group associated with an event, the group comprising a plurality of participants;
determining, for each participant in the group, available modes of communication with the participant;
determining, for each mode of communication, first information usable in a network associated with each mode of communication for contacting the participant in the corresponding mode of communication;
creating, for each mode of communication, second information that serves as an alias for the participant; and
providing a consolidated view of the available modes of communication with each of the participants in the group, the view not including the first information, wherein the control module is configured to receive communications directed to a first participant in the group, the first participant being identified in the communications using the first participant's second information, and direct the communications to the first participant using the participant's first information;

wherein the control module is configured to filter the consolidated view that is provided by the control module.

14. The system of claim 13 wherein the consolidated view of the available modes of communication includes a mode of communication for each of a plurality of different social networks.

15. The system of claim 13 wherein the consolidated view includes at least some of the second information.

16. The system of claim 13 wherein the control module is configured to terminate the first participant's membership in the ad-hoc group.

17. The system of claim 15 wherein the control module terminates the first participant's membership in the ad-hoc group by at least one of:
- ceasing to redirect communications to the first participant;
- ceasing to accept communications from the first participant;
- discarding, deleting, or deactivating the participant's first information; and
- discarding, deleting, or deactivating the participant's second information.

18. The system of claim 13 wherein the control module is configured to dismantle the ad-hoc group and dismantle or deactivate communications that use the participants' second information.

19. The system of claim 13 comprising a database for maintaining information associated with events.

20. The system of claim 19 wherein the information associated with events includes the participants' first information and the participants' second information.

21. The system of claim 13 wherein the control module is configured to receive communications directed to the group as a whole, and, in response to receiving communications directed to the group as a whole, forward the communications to each of the participants of the group, each participant being identified using the respective participant's first information.

22. The system of claim 13 wherein the control module comprises a client device, a server device, or a combination of the above.

23. The system of claim 13 wherein the control module is configured to maintain and enforce authentication or authorization policies associated with a group.

* * * * *